US012222062B2

(12) United States Patent
Chai et al.

(10) Patent No.: US 12,222,062 B2
(45) Date of Patent: Feb. 11, 2025

(54) FOLDABLE SUPPORT

(71) Applicant: ZHONGSHAN LONGXIN HOUSEHOLD PRODUCTS CO., LTD., Zhongshan (CN)

(72) Inventors: Ming-Yong Chai, Zhongshan (CN); Zhong-Xiong Cheng, Zhongshan (CN); Bao-Lin Chen, Zhongshan (CN); Chia-Hung Wu, Zhongshan (CN)

(73) Assignee: Yingsibolian (Wuhan) Import and Export Trading Co., Ltd., Wuhan (CN)

( * ) Notice: Subject to any disclaimer, the term of this patent is extended or adjusted under 35 U.S.C. 154(b) by 0 days.

(21) Appl. No.: 18/312,298

(22) Filed: May 4, 2023

(65) Prior Publication Data
US 2024/0035612 A1 Feb. 1, 2024

(30) Foreign Application Priority Data

Jul. 27, 2022 (CN) .......................... 202221961705.6

(51) Int. Cl.
*F16M 11/38* (2006.01)
*A01K 1/035* (2006.01)
(Continued)

(52) U.S. Cl.
CPC ........... *F16M 11/38* (2013.01); *A01K 1/0353* (2013.01); *A47D 7/002* (2013.01); *A47D 9/005* (2013.01)

(58) Field of Classification Search
CPC ........ F16M 11/38; A47D 7/002; A47D 9/005; A01K 1/0353; F16B 7/1472
(Continued)

(56) References Cited

U.S. PATENT DOCUMENTS

| 1,460,929 | A | * | 7/1923 | Vierling | ................... | B62B 7/12 |
| | | | | | | 301/132 |
| 2,194,800 | A | * | 3/1940 | Ley | ...................... | F16B 7/1472 |
| | | | | | | 248/166 |

(Continued)

FOREIGN PATENT DOCUMENTS

| CN | 2757684 Y | * | 2/2006 | ............. | A47D 9/053 |
| CN | 2757686 Y | * | 2/2006 | ............. | A47D 9/005 |

(Continued)

*Primary Examiner* — Taylor Morris

(57) ABSTRACT

A foldable support, wherein the foldable support comprises two first supporting members, two second supporting members, two first assembly portions, and two second assembly portions. The first supporting members are able to be rotatably unfolded relative to the second supporting members or be drawn together and folded up. First linking members are respectively movable connected to the two first assembly portions close to the ends of a second supporting arm, and the other ends of the two second linking members are respectively correspondingly hinged to the two second supporting members. The two second assembly portions are respectively correspondingly hinged to the two second supporting members, and each of the second assembly portions, close to the ends of the first supporting arm, are movable connected to first linking members. The two first linking members are respectively correspondingly hinged to the two first supporting members.

7 Claims, 10 Drawing Sheets

(51) Int. Cl.
*A47D 7/00* (2006.01)
*A47D 9/00* (2006.01)

(58) Field of Classification Search
USPC .................................................. 248/188.6
See application file for complete search history.

(56) References Cited

U.S. PATENT DOCUMENTS

| | | | | |
|---|---|---|---|---|
| 2,594,262 A * | 4/1952 | Howe | ................... | A47B 31/04 108/81 |
| 2,991,486 A * | 7/1961 | Hamilton | ............. | A47D 13/063 5/98.1 |
| 3,144,841 A * | 8/1964 | Meringoff | ............ | A47B 25/003 108/174 |
| 4,192,480 A * | 3/1980 | Schmidt | ................ | F16M 11/22 248/436 |
| 4,455,697 A * | 6/1984 | Rovida | ................. | A47D 7/002 256/25 |
| 4,635,305 A * | 1/1987 | Wyss | ..................... | A47D 7/002 5/99.1 |
| 5,542,639 A * | 8/1996 | Wixey | ................. | B23D 47/025 248/440 |
| 5,988,573 A * | 11/1999 | Mueller | ............... | F16M 11/242 248/161 |
| 6,142,699 A * | 11/2000 | Pao | ...................... | F16B 7/1454 403/109.5 |
| 6,158,361 A * | 12/2000 | Zheng | .................. | A47B 3/12 108/118 |
| 6,282,084 B1 * | 8/2001 | Goerdt | ................. | G06F 1/1656 248/676 |
| 6,722,293 B2 * | 4/2004 | Lee | ......................... | A47B 3/02 108/118 |
| 7,168,372 B2 * | 1/2007 | Fotia | ..................... | A47B 3/002 108/77 |
| 7,458,115 B2 * | 12/2008 | Chen | .................... | A47D 13/063 5/99.1 |
| 7,464,420 B2 * | 12/2008 | Chen | .................... | A47D 13/063 5/98.1 |
| 7,802,840 B1 * | 9/2010 | Shea | ........................ | B60P 3/39 296/190.02 |
| 8,844,072 B2 * | 9/2014 | Bellows | ................. | A47C 9/005 5/101 |
| 9,138,070 B1 * | 9/2015 | Shamie | ................. | A47D 7/002 |
| 9,770,118 B2 * | 9/2017 | Mountz | ................ | A47D 13/063 |
| 10,882,662 B2 | 1/2021 | Mu | | |
| 11,130,512 B1 * | 9/2021 | Mayo, IV | ................ | B62B 3/02 |
| 11,779,130 B2 * | 10/2023 | Zhong | ................... | A47D 9/005 5/99.1 |
| 12,122,440 B2 * | 10/2024 | Yang | ...................... | B62B 3/007 |
| 2012/0324682 A1 * | 12/2012 | Ballentine | ............ | F16B 7/1454 24/535 |

FOREIGN PATENT DOCUMENTS

| | | | | |
|---|---|---|---|---|
| CN | 206910143 U | * | 1/2018 | ............. A47D 9/005 |
| CN | 207323155 U | * | 5/2018 | ............. A47D 9/005 |
| CN | 112754217 A | * | 5/2021 | ............. A47D 7/002 |
| CN | 117502859 A | * | 2/2024 | ............. F16M 11/38 |
| DE | 102018219509 A1 | * | 5/2019 | ........... A47D 13/061 |
| GB | 733327 A | * | 7/1955 | ............. A47D 9/005 |
| GB | 2294875 A | * | 5/1996 | ............. A47D 9/005 |
| GB | 2471937 A | * | 1/2011 | ............. A47D 9/005 |

* cited by examiner

FOLDABLE SUPPORT

BACKGROUND OF THE INVENTION

(a) Field of the Invention

The present utility model relates to the field of foldable household appliances, and more particularly to relates to a foldable support.

(b) Description of the Prior Art

Foldable baths and foldable beds for infants or pets that exist in the present market mainly comprise a foldable support, wherein the foldable support is fitted with a holder body or bed body. The holder body or bed body is able to fold up along with the foldable support, thereby reducing the space occupied thereby and facilitating storing away thereof. However, the folding process of the foldable support of the foldable baths or foldable beds is relatively complicated, and usually requires a rotating folding operation of different portions of the foldable support, and thus highly inconvenient.

SUMMARY OF THE INVENTION

The present utility model aims to at least resolve one of the technical problems existing in the present art. Accordingly, present utility model provides a foldable support that enables simplifying the folding process and provide convenient operation.

The present utility model provides a foldable holder with the above-described foldable support.

The present utility model provides a foldable bed with the above-described foldable support.

A first embodiment of a foldable support of the present utility model provides a foldable support, comprising a first assembly member, a second assembly member, and a first supporting arm hinged to a second supporting arm. The first supporting arm comprises two first supporting members separately configured so as to reach from the front to the rear of the foldable support, and the second supporting arm comprises two second supporting members separately configured so as to reach from the front to the rear of the foldable support. The first supporting members and the second supporting members are able to be rotatably opened relative to each other to unfold or be rotatably drawn together to fold up. The first assembly member comprises two first assembly portions separately configured so as to reach from the front to the rear of the foldable support. The two first assembly portions are respectively correspondingly hinged to the two first supporting members. The end of each of the two first assembly portions, close to the second supporting arm, is movably connected to a first linking member. One end of each of the two first linking members is able to slide and rotate relative to the respective first assembly portion, and the other ends of the two first linking members are respectively correspondingly hinged to the two second supporting members. The ends of the two first assembly portions, away from the second supporting arm, are interconnected and/or the other ends of the two first linking members are interconnected. The second assembly member comprises two second assembly portions separately configured so as to reach from the front to the rear of the foldable support. The two second assembly portions are respectively correspondingly hinged to the two second supporting members. The end of each of the two second assembly portions, close to the first supporting arm, is movably connected to a second linking member. The second linking members are able to slide and rotate relative to the respective second assembly portions, and the two second linking members are respectively correspondingly hinged to the two first supporting members. The second linking members and the first linking members positioned on the same side are hinged to each other.

According to the foldable support provided by the present utility model, the foldable support is provided with at least the following beneficial effects: Because the other ends of the two first assembly portions are interconnected and/or the other ends of the two first linking members are interconnected, this enables interconnecting the two first assembly portions, the two first linking members, the two second supporting members, the two first supporting members, and the two second assembly portions. Hence, rotating either one of the first assembly member, the first supporting members, the second supporting members, the second assembly member, the first linking members, or the second linking members enables completing folding of the foldable support through the interconnecting configuration. For example, when the first assembly portion is rotatably drawn close to the first supporting members, the first linking members are driven and drawn close to the first supporting members, the first linking members then drive and draw the second supporting members close to the first supporting members, which further draws the second linking members close to the second supporting members, as well as rotating and drawing the second assembly portions close to the first supporting members, thereby completing the folding action of the foldable support. Accordingly, the above-described configuration enables simplifying the folding process of the foldable support, providing convenient operation thereof.

According to the embodiment of the present utility model, a first strip-shaped hole is provided in the end of each of the first assembly portions close to the second supporting arm. A first slide shaft is connected to each of the first linking members, wherein the first slide shafts are respectively inserted into the first strip-shaped holes to rotate therein and enable sliding therealong. A second first strip-shaped hole is provided in each of the second assembly portions, and a second slide shaft is connected to each of the second linking members, wherein the second slide shafts are respectively inserted into the second strip-shaped holes to rotate therein and enable sliding therealong.

According to the embodiment of present utility model, when the first supporting members are in an unfolded state relative to the second supporting members, each of the first slide shafts butt connects with an inner wall at one end of the respective first strip-shaped hole.

According to one embodiment of the present utility model, the foldable support further comprises a first limiting meta structure, whereby when the first supporting members are in an unfolded state relative to the second supporting members, the first limiting meta structure enables limiting the continued rotating unfolding of the first supporting members and the second supporting members.

According to one embodiment of present utility model, the first limiting meta structure comprises two mutually hinged limiting members, separating ends of which are respectively correspondingly hinged to the first supporting members and the second supporting members on the same side. When the first supporting members are in an unfolded state relative to the second supporting members, the included angle between the two limiting members is 180 degrees.

According to the embodiment of present utility model, the ends of the two first linking members are connected to first supporting bars away from the first assembly portions, and the ends of the two second linking members are connected to second supporting bars away from the second assembly portions. When the first supporting members are in an unfolded state relative to the second supporting members, the first supporting bars and the second supporting bars are level; thus, the first supporting bars, the second supporting bars, the two first linking members, the two second linking members, the first assembly member, and the second assembly member form an enclosed holding cavity.

According to the embodiment of present utility model, third supporting bars are respectively connected between the two first supporting members, and fourth supporting bars are respectively connected between the two second supporting members. When the first supporting members are in an unfolded state relative to the second supporting members, the third supporting bars, the fourth supporting bars, and the first supporting bars are level.

According to the embodiment of present utility model, the lengths of the first supporting arm and the second supporting arm are adjustable.

According to the embodiment of present utility model, the first supporting arm comprises a first slide bushing installed on each of the lower ends of the first supporting members, and a first adjustment member is slidable disposed inside each of the first slide bushings. A first locking device is fitted between each of the first slide bushings and the first adjustment members for locking the first adjustment members. The second supporting arm comprises a second slide bushing installed on each of the lower ends of the second supporting members, and a second adjustment member is slidable disposed inside each of the first slide bushings. A second locking device is fitted between each of the second slide bushings and the second adjustment members for locking the second adjustment members.

According to the embodiment of present utility model, the first supporting members are respectively provided with first hinge points and second hinge points, wherein the first hinge points are respectively located on the upper ends of the first supporting members, and the second hinge points are respectively located below the first hinge points. The first supporting members and the second supporting members positioned on the same side are hinged to each other at the second hinge points; the first assembly portions and the first supporting members are hinged at the first hinge points; and the second assembly portions are hinged to the upper ends of the second supporting members. When the first supporting members are in an unfolded state relative to the second supporting members, the first assembly portions are level with the second assembly portions.

A second embodiment of the present utility model provides a foldable holder that comprises the above-described foldable support and a holder body, wherein the holder body is mounted between the two first assembly portions, that is, one end of the holder body is connected to the two first assembly portions, and is able to rotatably unfold or fold along with the first assembly portions relative to the first supporting members. The other end of the holder body is connected to the two second assembly portions, and is able to rotatably unfold or fold along with the second assembly portions relative to the second supporting members.

According to the foldable holder provided by the present utility model, the foldable holder is provided with at least the following beneficial effects: adopting the above-described configuration for the foldable support enables simplifying the folding process, as well as providing convenient operation.

A subcontracted embodiment of the present utility model provides a foldable bed, which comprises the above-described foldable support and a bed body, wherein one end of the bed body is connected to the two first assembly portions, and is able to rotatably unfold or fold along with the first assembly portions relative to the first supporting members, and the other end of the bed body is connected to the two second assembly portions, and is able to rotatably unfold or fold along with the second assembly portions relative to the second supporting members.

According to the foldable bed provided by the present utility model, the foldable bed is provided with at least the following beneficial effects: adopting the above-described configuration for the foldable support enables simplifying the folding process, as well as providing convenient operation.

To enable a further understanding of said objectives, structures, characteristics, and effects, as well as the technology and methods used in the present invention and effects achieved, a brief description of the drawings is provided below followed by a detailed description of the preferred embodiments.

BRIEF DESCRIPTION OF THE DRAWINGS

The above description and/or additional aspects and advantages of the present utility model will become clear and easily understood when combined with the following description of the drawings for the embodiments, wherein.

DETAILED DESCRIPTION OF THE PREFERRED EMBODIMENTS

Figure 1:
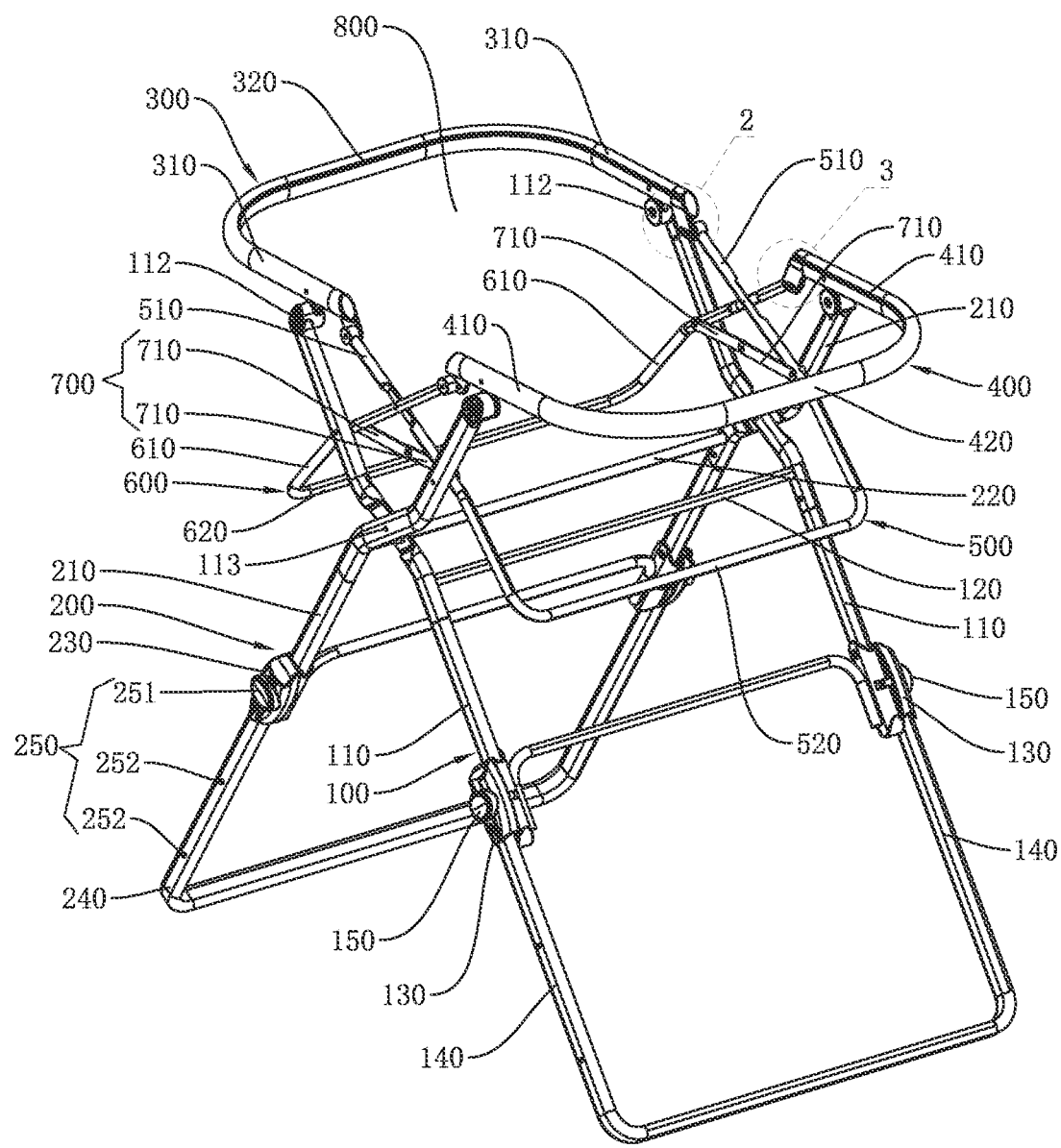
FIG. 1 is a schematic view of an embodiment of the present utility model showing a foldable support in an unfolded state (a first supporting arm and a second supporting arm are in an extended state).
Figure 3:
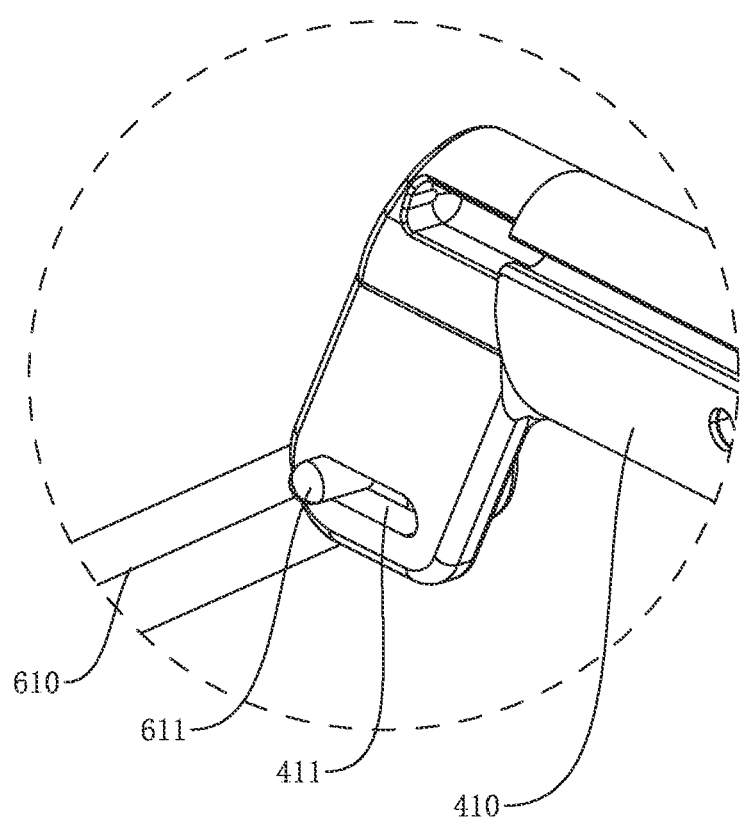
FIG. 3 is an enlarged view of area 3 indicated in FIG. 1.
Figure 6:
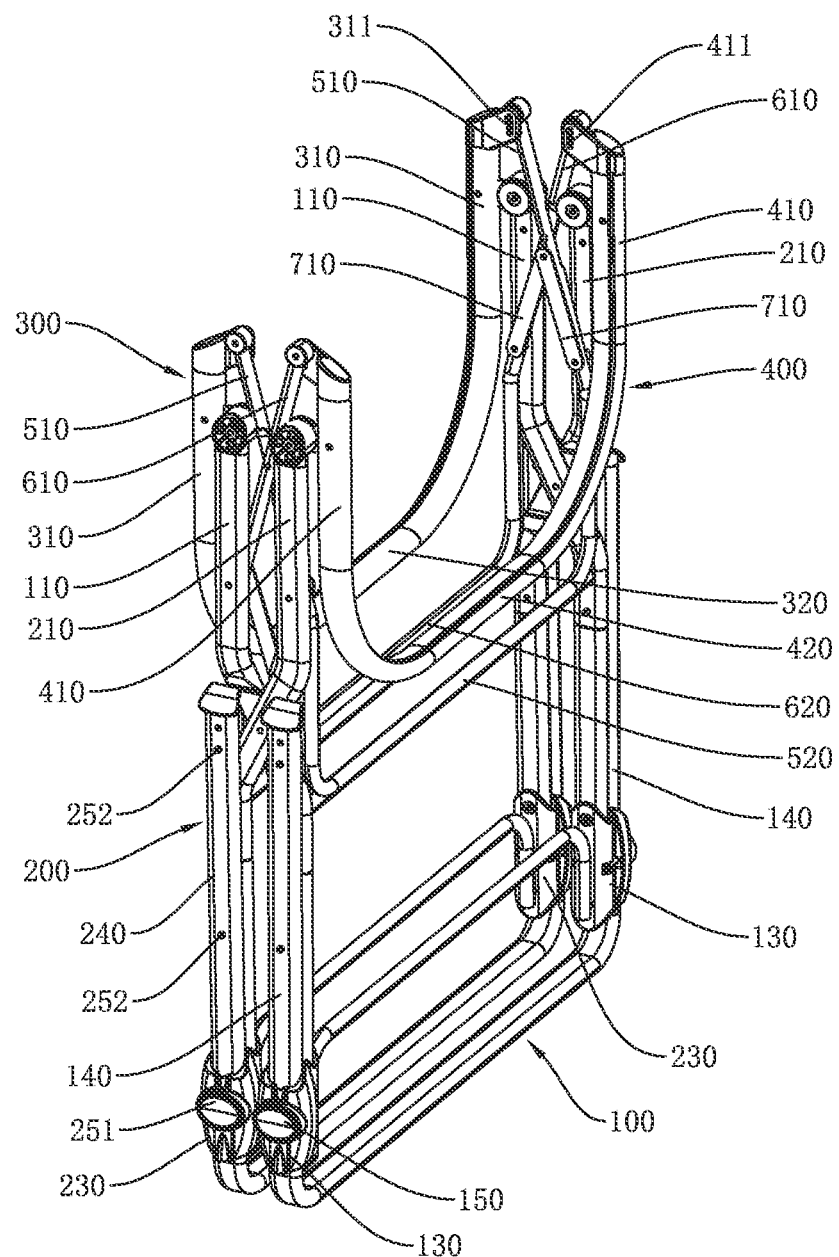
FIG. 6 is a schematic view of the embodiment of the present utility model showing the foldable support in a folded state.

Referring to FIGS. 1, 3 and 6, which show a first embodiment of a foldable support of the present invention, comprising a first assembly member 300, a second assembly member 400, and a first supporting arm 100 hinged to a second supporting arm 200. The first supporting 100 arm comprises two first supporting members 110 separately configured so as to reach from the front to the rear of the foldable support, and the second supporting arm 200 comprises two second supporting members 210 separately configured so as to reach from the front to the rear of the foldable support. The first supporting members 110 and the second supporting members 210 are able to be rotatably opened relative to each other to unfold or be rotatably drawn together to fold up. The first assembly member 300 comprises two first assembly portions 310 separately configured so as to reach from the front to the rear of the foldable support. The two first assembly portions 310 are respectively correspondingly hinged to the two first supporting members 110. Each end of the two first assembly portions 310, close to the second supporting arm 200, is movably connected to a first linking member 510. One end of each of the two first linking members 510 is able to slide and rotate relative to the respective first assembly portion 310, and the other ends of the two first linking members 510 are respectively correspondingly hinged to the two second supporting members 210. Ends of the two first assembly portions 310, away from the second supporting arm 200, are interconnected and/or the ends of the two first linking members 510 are interconnected. The second assembly member 400 comprises two second assembly portions 410 separately configured so as to reach from the front to the rear of the foldable support. The two second assembly portions 410 are respectively correspondingly hinged to the two second supporting members 210. Each of the second assembly portions 410, close to one end of the first supporting arm 100, is movably connected to a second linking member 610. One end of each of the second linking members 610 is able to slide and rotate relative to the respective second assembly portion 410, and the two second linking members 610 are respectively correspondingly hinged to the two first supporting members 110. The second linking members 610 and the first linking members 510 positioned on the same side are hinged to each other.

Because the other ends of the two first assembly portions 310 are interconnected and/or the other ends of the two first linking members 510 are interconnected, this enables interconnecting the two first assembly portions 310, the two first linking members 510, the two second linking members 610, the two second supporting members 210, the two first supporting members 110, and the two second assembly portions 410. Hence, rotating either one of the first assembly members 300, the first supporting members 110, the second supporting members 210, the second assembly member 400, the first linking members 510, or the second linking members 610 enables completing folding of the foldable support through the interconnecting configuration. For example, when the first assembly portion 310 is rotatably drawn close to the first supporting members 110, the first linking members 510 are driven and drawn close to the first supporting members 110, the first linking members 510 then drive and draw the second supporting members 210 close to the first supporting members 110, which further draws the second linking members 610 close to the second supporting members 210, as well as rotating and drawing the second assembly portions 410 close to the second supporting members 210, thereby completing the folding action of the foldable support. Accordingly, the above-described configuration enables simplifying the folding process of the foldable support, providing convenient operation thereof.

The sliding range of the first linking members 510 enables limiting the unfolding rotation range of the first supporting members 110 relative to the second supporting members 210. Specifically, during the unfolding process of the first supporting members 110 relative to the second supporting members 210, because the second linking members 610 are hinged to the first linking members 510 positioned on the same side, when the first linking members 510 slide to their limiting positions relative to the first assembly portions 310, the first assembly portions 310 are pulled by the first linking members 510 preventing continue rotation thereof. Furthermore, the first supporting members 110 cannot continue to rotate relative to the second supporting members 210. Hence, the extent to which the first supporting members 110 can rotate and unfold relative to the second supporting members 210 is limited. In the same way, the sliding range of the ends of the second linking members 610 also enables limiting the unfolding rotation range of the first supporting members 110 relative to the second supporting members 210.

Referring to FIGS. 1 and 6, specifically, during the folding process of the foldable support, the first assembly portions 310 are rotated downward following the first supporting members 110 away from one side of the second assembly portions 410 and drawn close to the first supporting members 110; and the second assembly portions 410 are rotated downward following the second supporting members 210 away from one side of the first assembly portions 310 and drawn close to the second supporting members 210. Accordingly, the first supporting members 110 and the second supporting members 210 are mutually rotated and drawn close together, whereby the first linking members 510 and the second linking members 610 are thus drawn together between the first assembly portions 310 and the second assembly portions 410.

Figure 10:
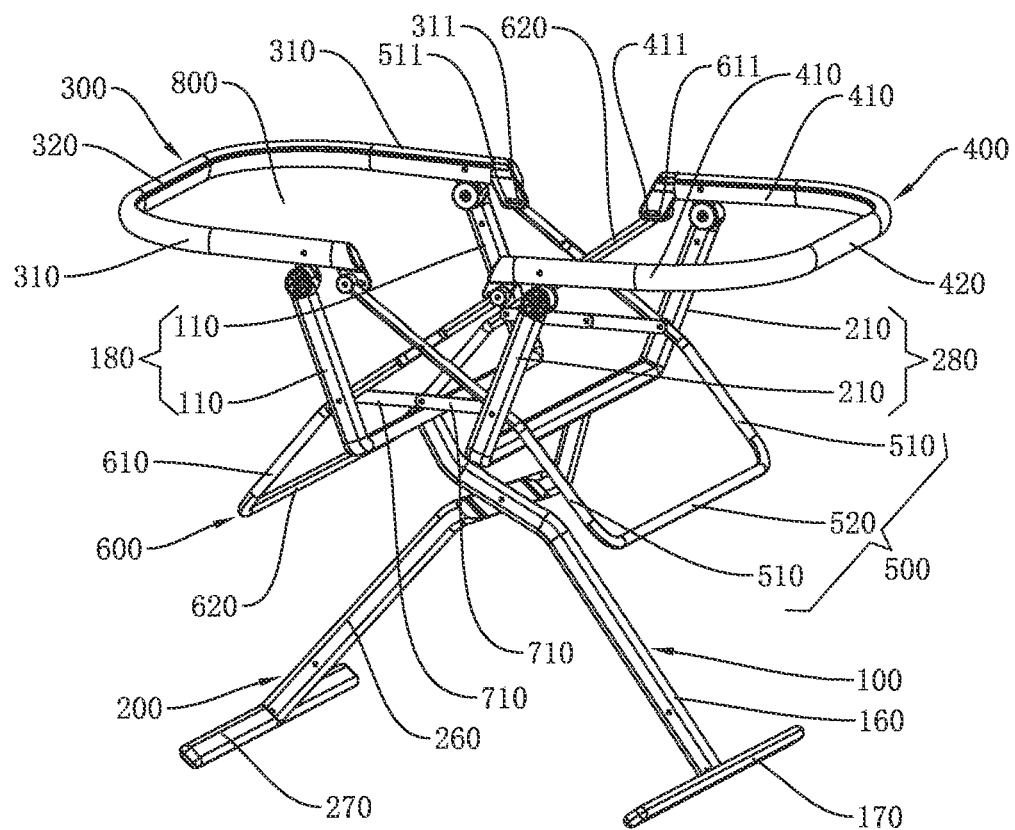
FIG. 10 is an unfolded three-dimensional view of the second embodiment of the present invention in which the first supporting arm and the second supporting arm are hinged to each other.

It is hereby specifically pointed out that the hinge method between the first supporting arm 100 and the second supporting arm 200 can adopt a variety of enabled configurations. For example, referring to FIGS. 1 and 4, in one embodiment of the present invention, the first supporting members 110 are respectively provided with first hinge points 112 and second hinge points 113, wherein the first hinge points 112 are respectively located on the upper ends of the first supporting members 110, and the second hinge points 113 are respectively located below the first hinge points 112. The first supporting members 110 and the second supporting members 210 positioned on the same side are hinged to each other at the second hinge points 113; the first assembly portions 310 and the first supporting members 110 are hinged at the first hinge points 112; and the second assembly portions 410 are hinged to the upper ends of the second supporting members 210. Or in another embodiment of the present invention, referring to FIG. 10, the first supporting arm 100 includes first connecting pins 160, the lower ends of which are connected to first support struts 170 configured so as to reach from the front to the rear. The lower ends of the two first supporting members 110 are interconnected with a first U-shaped supporting member 180, wherein the first U-shaped supporting member 180 connects to the upper ends of the first connecting pins 160. The second supporting arm 200 includes second connecting pins 260, the lower ends of the second connecting pins 260 are connected to second support struts 270 configured so as to reach from the front to the rear. The lower ends of the two second supporting members 210 are interconnected with a second U-shaped supporting member 280, the second U-shaped supporting member 280 connects to the upper ends of the second connecting pins 260, wherein the first connecting pins 160 and the second connecting pins 260 are hinged together.

Figure 4:
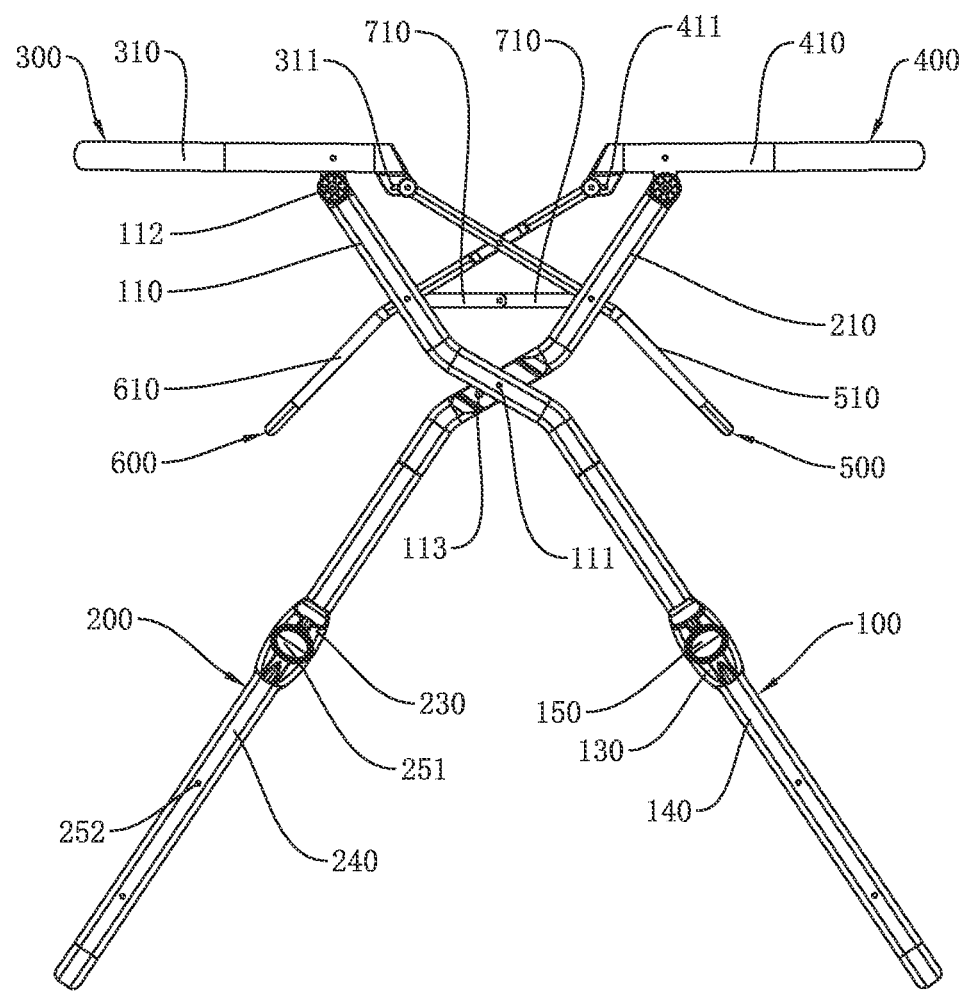
FIG. 4 is a side view showing the foldable support.

Referring to FIGS. 1 and 4, which show the foldable support in an unfolded state, that is, when the first supporting members 110 are in an unfolded state relative to the second supporting members 210, the first assembly portions 310 are level with the second assembly portions 410. Accordingly, two ends of a holder body can be conveniently correspondingly assembled on the first assembly portions 310 and the second assembly portions 410.

Figure 5:
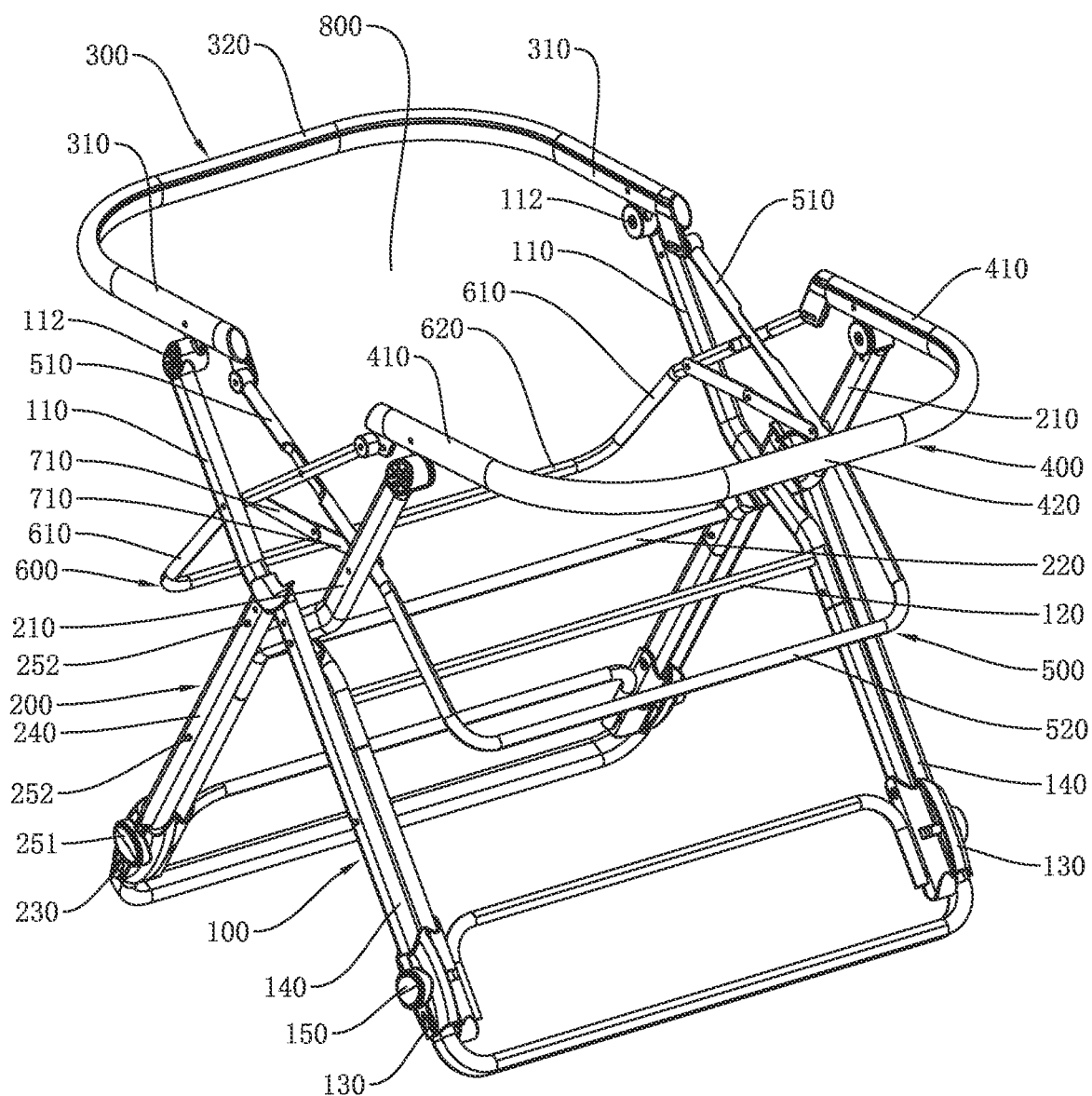
FIG. 5 is a schematic view of the embodiment of the present utility model showing the foldable support in an unfolded state (the first supporting arm and the second supporting arm are in a shortened state).

Referring to FIGS. 1 and 5, in the embodiment of the present invention, a first guard rail 320 is connected between the two first assembly portions 310 away from the ends of the second supporting members 210, which causes the first assembly member 300 to assume a U-shape, whereby the user is able to conveniently operate the first assembly member 300, as well as increasing the strength thereof. A second guard rail 420 is connected between the two second assembly portions 410 away from the ends of the first supporting members 110, which causes the second assembly member 400 to assume a U-shape, whereby the user is able to conveniently operate the second assembly member 400, as well as increasing the strength thereof. When the first supporting members 110 are in an unfolded state relative to the second supporting members 210, the first assembly member 300 and the second assembly member 400 form an enclosed frame, which enables a holder body to be conveniently assembled thereon, as well as limiting the holder body to within the frame. The two first assembly portions 310 and the first guard rail 320 can be formed as an integral body, and the two second assembly portions 410 and the second guard rail 420 can be formed as an integral body, thereby facilitating the manufacturing process and reducing costs.

Figure 2:
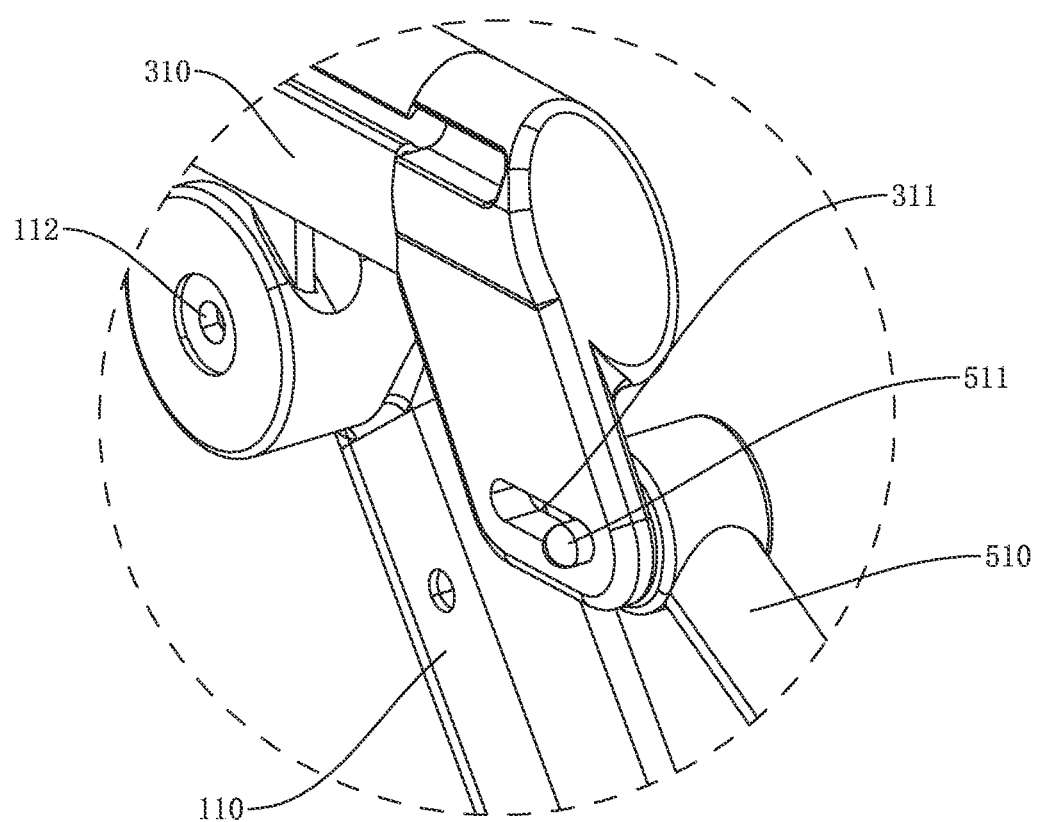
FIG. 2 is an enlarged view of area 2 indicated in FIG. 1.

Referring to FIGS. 1 to 3, a first strip-shaped hole 311 is provided in each end of the first assembly portions 310 close to the second supporting arm 200. A first slide shaft 511 is connected to each of the first linking members 510, wherein the first slide shafts 511 are respectively inserted into the first strip-shaped holes 311 to rotate therein and enable sliding therealong. A second strip-shaped hole 411 is provided in each end of the second assembly portions 410 close to the first supporting arm 100. A second slide shaft 611 is connected to each of the second linking members 610, wherein the second slide shafts 611 are respectively inserted into the second strip-shaped holes 411 to rotate therein and enable sliding therealong. Accordingly, when the first assembly portions 310 are rotating relative to the first supporting member 110, the ends of the first linking members 510 are able to slide and rotate relative to the first assembly portions 310. When the second assembly portions 410 are rotating relative to the second supporting members 210, the second linking members 610 are able to slide and rotate relative to the second assembly portions 410.

In one embodiment of the present invention, the above-described foldable support further comprises a first limiting meta structure 700, whereby when the first supporting members 110 are in an unfolded state relative to the second supporting members 210, the first limiting meta structure 700 enables limiting the continued rotating unfolding of the first supporting members 110 and the second supporting members 210.

Referring to FIGS. 1 and 2, in the embodiment of the present invention, the first limiting meta structure 700 comprises the above-described first slide shafts 511 and an inner wall at one end of each of the above-described first strip-shaped holes 311, whereby when the first supporting members 110 are in an unfolded state relative to the second supporting members 210, each of the first slide shafts 511 butt connects with the inner wall at one end of the respective first strip-shaped hole 311. Because the second linking members 610 and the first linking members 510 positioned on the same side are hinged together, the first slide shafts 511 interoperate with the inner walls at the ends of the first strip-shaped holes 311 to form a limiting function, this halts further relative unfolding between the first linking members 510 and the first assembly portions 310, and further halts the continued rotating unfolding of the first supporting members 110 and the second supporting members 210. Further, the first linking members 510 are still able to form a support for the first assembly portions 310 close to the ends of the second assembly portions 410.

Referring to FIGS. 1 and 3, in the embodiment of the present invention, the first limiting meta structure 700 comprises the above-described second slide shafts 611 and the above-described inner walls at the ends of the second strip-shaped holes 411, whereby when the first supporting members 110 are in an unfolded state relative to the second supporting members 210, each of the second slide shafts 611 butt connects with the respective inner wall at one end of the first strip-shaped hole 411. Because the second slide shafts 611 interoperate with the inner walls at the ends of the second strip-shaped holes 411 to form a limiting function, this halts further relative unfolding between the second linking members 610 and the second assembly portions 410, and further halts the continued rotating unfolding of the first supporting members 110 and the second supporting members 210. Further, the second linking members 610 are still able to form a support for the second assembly portions 410 close to the ends of the first assembly portions 310.

Referring to FIGS. 1 and 4, in the embodiment of the present invention, the first limiting meta structure 700 comprises two mutually hinged limiting members 710, separating ends of which are respectively correspondingly hinged to the first supporting members 110 and the second supporting members 210 on the same side. When the first supporting members 110 are in an unfolded state relative to the second supporting members 210, the included angle between the two limiting members 710 is 180 degrees, thus, interoperation of the two limiting members 710 enables holding the first supporting members 110 and the second supporting members 210, thereby limiting the continued rotating unfolding of the first supporting members 110 and the second supporting members 210, as well as increasing the strength of the foldable support when in an unfolded state. In addition, the strength of the foldable support in an unfolded state is further increased through the two limiting movements formed through the respective interoperation of the two limiting members 710 and the interoperation of each of the first slide shafts 511 and the respective inner wall at one end of the first strip-shaped hole 311.

It is understood that in a specific embodiment one can choose not to install the two limiting members 710, but still form a limiting function through interoperation of each of the first slide shafts 511 and the respective inner wall at one end of the first strip-shaped hole 311; or choose to include interoperation of the two limiting members 710 to form a limiting function, and not use interoperation of the first slide shafts 511 and the inner walls at ends of the first strip-shaped hole 311 to form a limiting function.

It is hereby specifically pointed out that the above-described first limiting meta structure 700 can also adopt other configuration modes, such as comprising limiting posts 111 disposed on the first supporting members 110, whereby when the first supporting members 110 are in an unfolded state relative to the second supporting members 210, the limiting posts 111 are positioned below the second supporting members 210 and butt connect therewith. Accordingly, the limiting posts 111 are able to limit the continued rotating unfolding of the first supporting members 110 and the second supporting members 210; moreover, the limiting posts 111 are able to further support the second supporting members 210.

Referring to FIGS. 1 and 5, in the embodiment of the present invention, the ends of the two first linking members 510, away from the first assembly portions 310, are connected to first supporting bars 520, and the ends of the two second linking members 610, away from the ends of the second assembly portions 410, are connected to second supporting bars 620. When the first supporting members 110 are in an unfolded state relative to the second supporting members 210, the first supporting bars 520 and the second supporting bars 620 are level; thus, the first supporting bars 520, the second supporting bars 620, the two first linking members 510, the two second linking members 610, the first assembly member 300, and the second assembly member 400 form an enclosed holding cavity 800, which enables inserting a holder body therein. Moreover, the first supporting bars 520 and the second supporting bars 620 are able to support the bottom portion of a holder body.

Referring to FIGS. 1 and 5, wherein the first supporting bars 520 are connected to the first linking members 510 forming a first U-shaped member 500, which can be formed as an integral body, thereby facilitating the manufacturing process and reducing costs. And the second supporting bars 620 are connected to the two second linking members 610 forming a second U-shaped member 600, which can be formed as an integral body, thereby facilitating the manufacturing process and reducing costs.

Referring to FIGS. 1 and 5, in the embodiment of the present invention, third supporting bars 120 are respectively connected between the two first supporting members 110, and fourth supporting bars 220 are respectively connected between the two second supporting members 210. When the first supporting members 110 are in an unfolded state relative to the second supporting members 210, the third supporting bars 120, the fourth supporting bars 220, and the first supporting bars 520 are level. Accordingly, the third supporting bars 120 and the fourth supporting bars 220 are able to support the bottom portion of a holder body.

Referring to FIGS. 1 and 5, in the embodiment of the present invention, the lengths of the first supporting arm 100 and the second supporting arm 200 are adjustable. Hence, when the foldable support is in an unfolded state, adjusting the lengths of the first supporting arm 100 and the second supporting arm 200 enables adjusting the height of the foldable support. Accordingly, when the foldable support is in a folded state, the lengths of the first supporting arm 100 and the second supporting arm 200 can be adjustably shortened, thereby further reducing the space occupied by the foldable support, and facilitating storing away thereof.

Referring to FIGS. 1 and 5, in the embodiment of the present invention, the first supporting arm 100 comprises a first slide bushing 130 installed on each of the lower ends of the first supporting members 110, and a first adjustment member 140 slidable disposed inside each of the first slide bushings 130. A first locking device 150 is fitted between each of the first slide bushings 130 and the first adjustment members 140 for locking the first adjustment members 140. And the second supporting arm 200 comprises a second slide bushing 230 installed on each of the lower ends of the second supporting members 210, and a second adjustment member 240 slidable disposed inside each of the first slide bushings 230. A second locking device 250 is fitted between each of the second slide bushings 230 and the second adjustment members 240 for locking the second adjustment members 240.

Figure 7:
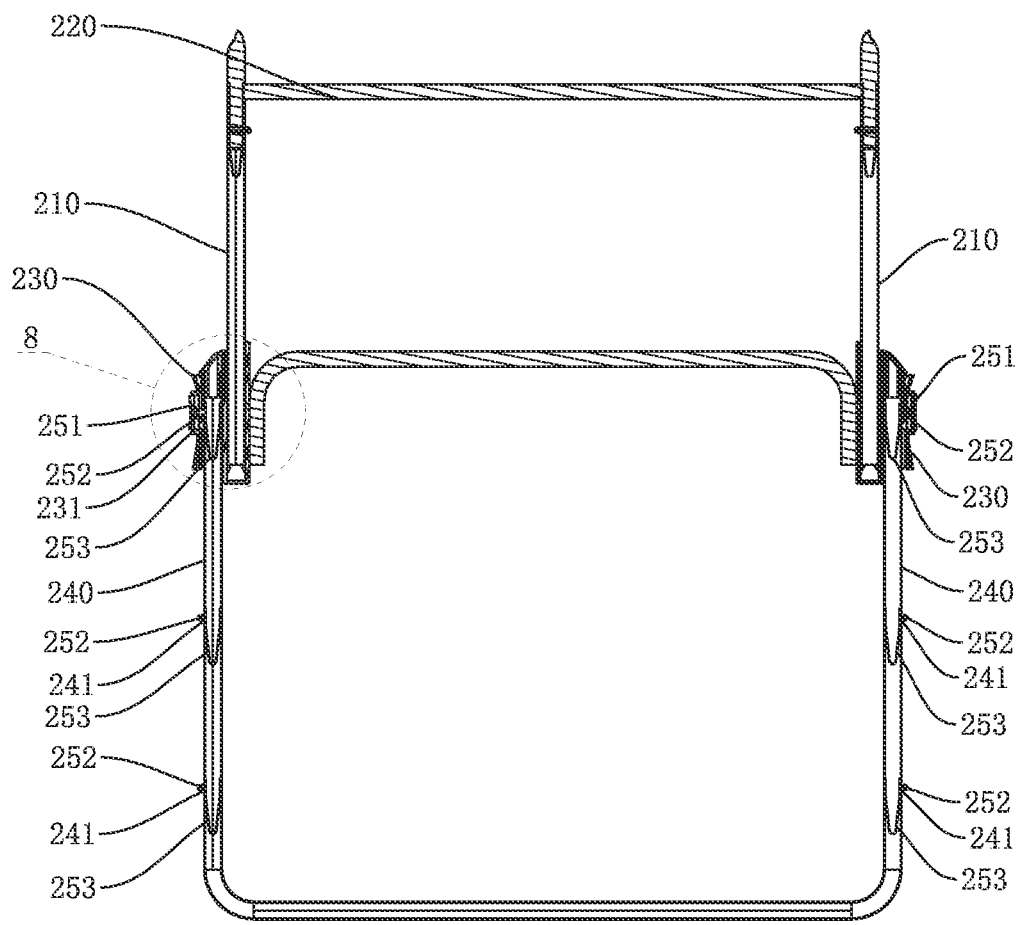
FIG. 7 is a cross-sectional view showing the second supporting arm of the foldable support of FIG. 1.
Figure 8:
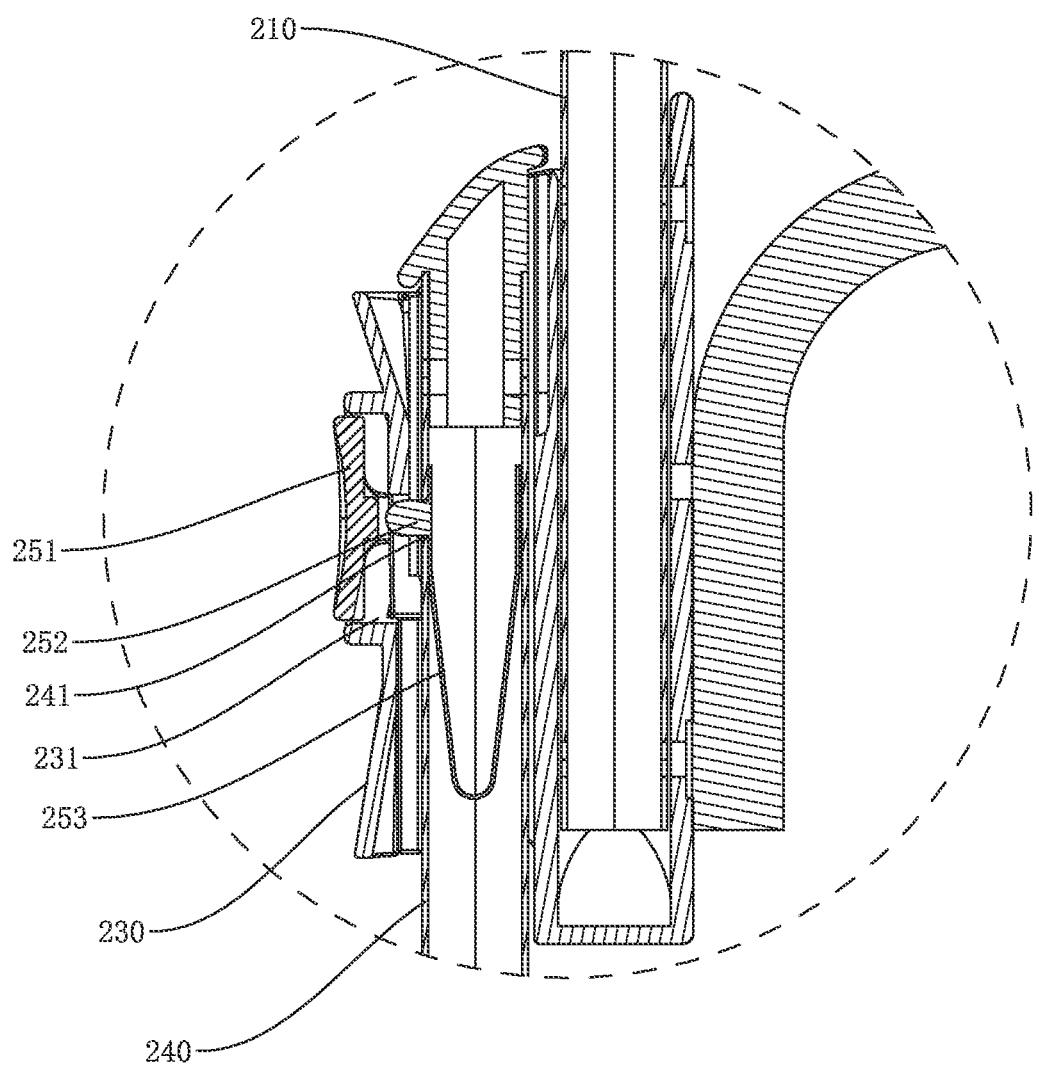
FIG. 8 is an enlarged view of area 8 indicated in FIG. 7.

Referring to FIGS. 7 and 8, specifically, the outer wall of each of the second slide bushings 230 is provided with an escape hole 231, and a plurality of mounting holes 241 are provided along the length of each of the second adjustment members 240. Each of the second locking devices comprises 250 a button 251 disposed on the outer wall of the second slide bushing 230, and a top bead 252 is positioned inside one of the mounting holes 241. The button 251 is positioned at the escape hole 231, an elastic member 253 is mounted inside the mounting holes 241, such as a spring or a spring piece, and the top bead 252 is connected to the elastic member 253. When the top bead 252 is aligned with the escape hole 231 on the second slide bushing 230, the elastic member 253 is able to push the top bead 252 to pass through and be disposed in the escape hole 231, thereby locking the second adjustment member 240. When it is necessary to slide the second adjustment member 240, pressing the button 251 presses and causes the top bead 252 to retract, thereby enabling the second adjustment member 240 to slide along the second slide bushing 230 relative to the second supporting member 210. From the above-described structural configuration, it is clear that by merely pressing the button 251 enables unlocking the second adjustment member 240, providing convenient operation and quickly adjusting the length of the second supporting arm 200.

Figure 9:
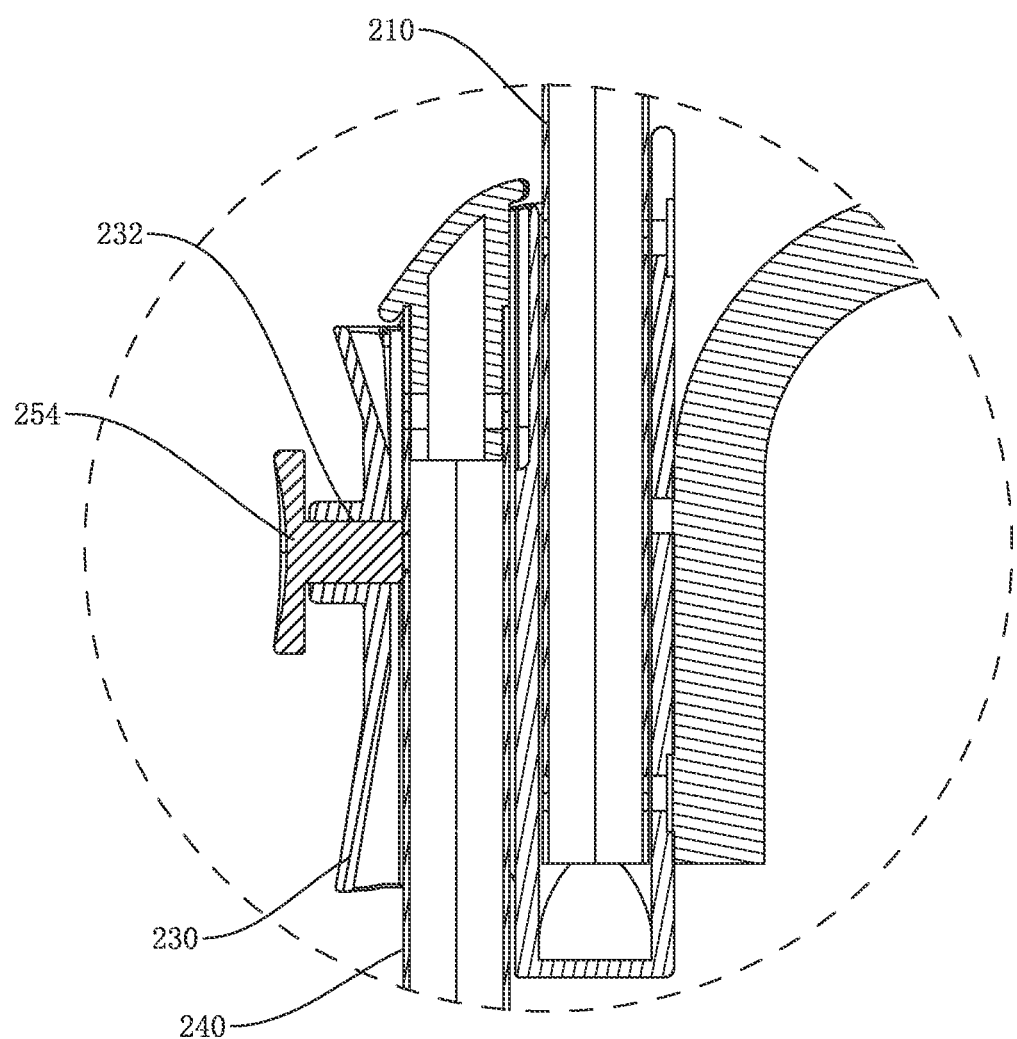
FIG. 9 is a cross-sectional schematic view of a second embodiment of a second locking device of the present invention.

Referring to FIG. 9, the above-described second locking device 250 can also adopt other configuration modes, such as providing threaded holes 232 on the second slide bushing 230 with screw bolts 254 screwed into the threaded holes 232, thus, locking or unlocking the second adjustment member 240 can be achieved by screwing the bolts 254.

The structure of the first locking device 150 is similar to that of the second locking device 250, and not further detailed herein.

It is hereby specifically pointed out that the first supporting arm 100 can also adopt other configuration modes to achieve adjusting the length of the first supporting arm 100, such as the first supporting members 110 being hollow, with the first supporting arm 100 comprising the first adjustment members 140 able to slidable insert inside the first supporting members 110, and each of the first locking devices 150 is installed between the first adjustment members 140 and the first supporting members 110. Accordingly, sliding the first adjustment members 140 enables adjusting the length of the first supporting arm 100, and after adjusting the length, the first locking devices 150 are used to lock the first adjustment members 140.

It is hereby specifically pointed out that the second supporting arm 200 can also adopt other configuration modes to achieve adjusting the length of the second supporting arm 200, such as the second supporting member 210 being hollow, with the second supporting arm 200 comprising the second adjustment members 240 able to slidable insert inside the second supporting members 210, and each of the second locking devices is installed between the second adjustment members 240 and the second supporting members 210. Accordingly, sliding the second adjustment members 240 enables adjusting the length of the second supporting arm 200, and after adjusting the length, the second locking devices 250 are used to lock the second adjustment members 240.

A second embodiment of the present utility model provides a foldable holder that comprises the above-described foldable support and a holder body (not shown in the drawings), wherein the holder body is mounted between the two first assembly portions 310, that is, one end of the holder body is connected to the two first assembly portions 310, and is able to rotatably unfold or fold along with the first assembly portions 310 relative to the first supporting members 110. The other end of the holder body is connected to the two second assembly portions 410, and is able to rotatably unfold or fold along with the second assembly portions 410 relative to the second supporting members 210. Adopting the above-described configuration for the foldable support enables rotating either one of the first assembly member 300, the first supporting members 110, the second supporting members 210, the second assembly member 400, the first linking members 510, or the second linking members 610, causing the first assembly portions 310 and one end of the holder body to rotate downward from the first supporting members 110 away from one side of the second assembly portions 410, to draw close and fold up towards the first supporting members 110, thereby causing the second assembly portions 410 and the other end of the holder body to rotate downward from the second supporting members 210 away from one side of the first assembly portions 310, to draw close and fold up towards the second supporting members 210. Accordingly, the first supporting members 110 and the second supporting members 210 are mutually rotated and drawn close together, thereby completing the folding action of the foldable support and the holder body. From the above-described structural configuration, the foldable holder provided by the present utility model achieves a simple folding process and convenient operation.

When wanting to use the above-described foldable holder, the user can unfold the foldable support and the holder body, and after use, the holder body and the foldable support can be folded up, facilitating storing away thereof.

During use of the above-described foldable holder, corresponding middle portions of the two ends of the holder body have a tendency to upwardly rotate; however, the first limiting meta structure 700 prevents the first assembly portions 310 and the second assembly portions 410 from upwardly rotating, further limiting upward rotation of the two ends of the holder body, thereby enabling the holder body and the foldable support to maintain an unfolded state. It is important to explain that a second limiting meta structure can also be installed between the two ends of the holder body and the middle portions thereof, wherein the second limiting meta structure can limit upward rotation and folding of the two ends of the holder body. Furthermore, through the limitation of the rotation range of the two ends of the holder body, the unfolding rotation range of the first supporting members 110 relative to the second supporting members 210 enables the holder body and the foldable support to maintain an unfolded state. Accordingly, the above-described first limiting meta structure 700 can be omitted.

A subcontracted embodiment of the present utility model provides a foldable bed, which comprises the above-described foldable support and a bed body (not shown in the drawings), wherein one end of the bed body is connected to the two first assembly portions 310, and is able to rotatably unfold or fold along with the first assembly portions 310 relative to the first supporting members 110, and the other end of the bed body is connected to the two second assembly portions 410, and is able to rotatably unfold or fold along with the second assembly portions 410 relative to the second supporting members 210. Adopting the above-described configuration for the foldable support, enables rotating either one of the first assembly member 300, the first supporting members 110, the second supporting members 210, the second assembly member 400, the first linking members 510, or the second linking members 610, causing the first assembly portions 310 and one end of the bed body to rotate downward from the first supporting members 110 away from one side of the second assembly portions 410, to draw close and fold up towards the first supporting members 110, and causing the second assembly portions 410 and the other end of the bed body to rotate downward from the second supporting members 210 away from one side of the first assembly portions 310, to draw close and fold up towards the second supporting members 210. The first supporting members 110 and the second supporting members 210 are mutually rotated and drawn close together, thereby completing the folding action of the foldable support and the bed body. From the above-described structural configuration, the foldable bed provided by the present utility model achieves a simple folding process and convenient operation.

When wanting to use the above-described foldable bed, the user can unfold the foldable support and the bed body, and after use, the bed body and the foldable support can be folded up, facilitating storing away thereof.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A foldable support, comprising:

mutually hinged first supporting arm and second supporting arm, the first supporting arm comprises two first supporting members separately configured so as to reach from a front to a rear of the foldable support, and the second supporting arm comprises two second supporting members separately configured so as to reach from a front to a rear of the foldable support, wherein the first supporting members and the second supporting members positioned on a same side are hinged to each other, the first supporting members rotatab ly unfold or fold up relative to the second supporting members;

a first assembly member, comprising two first assembly portions separately configured such that the foldable support is reached from the front to the rear thereof, the two first assembly portions are respectively correspondingly hinged to the two first supporting members, each end of the two first assembly portions, close to the second supporting arm, is movably connected to a first linking member, one end of each of the two first linking members is able to slide and rotate relative to the respective first assembly portion, and other ends of the two first linking members are respectively correspondingly hinged to the two second supporting members, the ends of the two first assembly portions, away from the second supporting arm, are interconnected and/or the other ends of the two first linking members are interconnected;

a second assembly member, comprising two second assembly portions separately configured such that the foldable support is reached from the front to the rear thereof, the two second assembly portions are respectively correspondingly hinged to the two second supporting members, each of the second assembly portions, close to one end of the first supporting arm, is movably connected to a second linking member, the second linking members are able to slide and rotate relative to the respective second assembly portions, and the two second linking members are respectively correspondingly hinged to the two first supporting members, the second linking members are hinged to the first linking members positioned on a same side;

wherein, a first strip-shaped hole is provided in each end of the first assembly portions close to one end of the second supporting arm; a first slide shaft is connected to each of the first linking members, wherein the first slide shafts are respectively inserted into the first strip-shaped holes to rotate therein and enable sliding therealong; a second strip-shaped hole is provided in each of the second assembly portions close to one end of the first supporting arm, and a second slide shaft is connected to each of the second linking members, wherein the second slide shafts are respectively inserted into the second strip-shaped holes to rotate therein and enable sliding therealong;

wherein, the foldable support further comprises a first limiting meta structure, whereby when the first supporting members are in an unfolded state relative to the second supporting members, the first limiting meta structure enables limiting the continued rotating unfolding of the first supporting members and the second supporting members.

2. The foldable support according to claim 1, wherein, the first limiting meta structure comprises the first slide shafts and inner walls at ends of the first strip-shaped holes, whereby when the first supporting members are in an unfolded state relative to the second supporting members, each of the first slide shafts abuts connects with the respective inner wall at one end of the first strip-shaped hole; or the first limiting meta structure comprises two mutually hinged limiting members, separate ends of which are respectively correspondingly hinged to the first supporting members and the second supporting members positioned on a same side, whereby when the first supporting members are in an unfolded state relative to the second supporting members, the included angle between the two limiting members is 180 degrees.

3. The foldable support according to claim 1, wherein, an end of each of the two first linking members areis connected to a first supporting bar away from the ends of the first assembly portions, and an end of each of the two second linking members are connected to a second supporting bar away from the ends of the second assembly portions, whereby when the first supporting members are in an unfolded state relative to the second supporting members, the first supporting bar and the second supporting bar are level; thus, the first supporting bar, the second supporting bar, the two first linking members, the two second linking members, the first assembly member, and the second assembly member form an enclosed holding cavity.

4. The foldable support according to claim 3, wherein, a third supporting bar is connected between the two first supporting members, and a fourth supporting bar is connected between the two second supporting members, whereby when the first supporting members are in an unfolded state relative to the second supporting members, the third supporting bar, the fourth supporting bar, and the first supporting bar are level.

5. The foldable support according to claim 1, wherein a length of the first supporting arm and a length of the second supporting arm are adjustable.

6. The foldable support according to claim 5, wherein, the first supporting arm comprises a first slide bushing installed on each of lower ends of the first supporting members, and a first adjustment member slidably disposed inside each of the first slide bushings; a first locking device is fitted between each of the first slide bushings and the first adjustment members for locking the first adjustment members; the second supporting arm comprises a second slide bushing installed on each of lower ends of the second supporting members, and a second adjustment member slidably disposed inside each of the second slide bushings; a second locking device is fitted between each of the second slide bushings and the second adjustment members for locking the second adjustment members.

7. The foldable support according to claim 1, wherein, the first supporting members are respectively provided with first hinge points and second hinge points, wherein the first hinge points are respectively located on upper ends of the first supporting members, and the second hinge points are respectively located below the first hinge points; the first supporting members and the second supporting members positioned on a same side are hinged to each other at the second hinge points; the first assembly portions and the first supporting members are hinged at the first hinge points, and the second assembly portions are hinged to upper ends of the second supporting members; when the first supporting members are in an unfolded state relative to the second supporting members, the first assembly portions are level with the second assembly portions.

* * * * *